US009613201B1

(12) United States Patent
Dotan et al.

(10) Patent No.: US 9,613,201 B1
(45) Date of Patent: Apr. 4, 2017

(54) ACCESS CONTROL BY A MOBILE DEVICE USING AN IMAGE (71) Applicant: EMC Corporation, Hopkinton, MA (US)

(72) Inventors: Yedidya Dotan, Newton, MA (US);
Lawrence N. Friedman, Arlington, MA (US); Gareth Richards, Woodstock (GB); Daniel V. Bailey, Pepperell, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 37 days.

(21) Appl. No.: 14/041,103

(22) Filed: Sep. 30, 2013

(51) Int. Cl.
G06F 7/04 (2006.01)
G06F 21/36 (2013.01)

(52) U.S. Cl.
CPC .................................. G06F 21/36 (2013.01)

(58) Field of Classification Search
CPC ... G07C 9/00142; G06F 21/36; G06F 21/316; H04L 9/3226
See application file for complete search history.

(56) References Cited

U.S. PATENT DOCUMENTS

| 5,559,961 | A | * | 9/1996 | Blonder | G07C 9/00142 |
| | | | | | 726/18 |
| 8,234,696 | B2 | | 7/2012 | O'Malley et al. | |
| 8,458,485 | B2 | * | 6/2013 | Bandyopadhyay | ... G06F 21/316 |
| | | | | | 713/184 |
| 8,618,913 | B1 | | 12/2013 | Bailey et al. | |
| 8,656,455 | B1 | | 2/2014 | Bailey et al. | |
| 8,792,862 | B1 | | 7/2014 | Juels | |
| 8,904,479 | B1 | * | 12/2014 | Johansson | ............... G06F 21/36 |
| | | | | | 382/181 |
| 8,934,940 | B1 | | 1/2015 | Juels | |
| 2004/0230843 | A1 | * | 11/2004 | Jansen | .................... G06F 21/36 |
| | | | | | 726/7 |
| 2010/0169669 | A1 | * | 7/2010 | Smith | ................. G06F 21/6218 |
| | | | | | 713/193 |
| 2010/0186074 | A1 | * | 7/2010 | Stavrou et al. | .................... 726/7 |
| 2011/0283353 | A1 | * | 11/2011 | Maetz | ..................... G06F 21/36 |
| | | | | | 726/18 |

(Continued)

OTHER PUBLICATIONS

Jermyn et al., The Design and Analysis of Graphical Passwords, Proceedings of the 8th USENIX Security Symposium, Washington, D.C., USA, Aug. 23-26, 1999.*

Primary Examiner — Morshed Mehedi
Assistant Examiner — Shu Chun Gao
(74) Attorney, Agent, or Firm — BainwoodHuang (57) ABSTRACT A technique provides access control on a mobile device (e.g., a smart phone, a tablet, etc.). The technique involves displaying an image on a touch screen of the mobile device. The technique further involves, while the image is displayed on the touch screen, receiving user input from a user. The user input includes user gestures applied to the touch screen over the displayed image. The technique further involves performing an access control operation which provides an access control result based on the user input, the access control result (i) providing access to a set of protected resources when the user input matches expected input and (ii) denying access to the set of protected resources when the user input does not match the expected input.

22 Claims, 5 Drawing Sheets (56) References Cited

U.S. PATENT DOCUMENTS

| | | | |
|---|---|---|---|
| 2012/0023574 A1* | 1/2012 | Osborn | G06F 21/36 726/19 |
| 2012/0102551 A1* | 4/2012 | Bidare | G06F 21/36 726/4 |
| 2012/0229411 A1* | 9/2012 | Arai | 345/173 |
| 2013/0212674 A1* | 8/2013 | Boger | G09B 21/008 726/17 |
| 2015/0012988 A1* | 1/2015 | Jeng et al. | 726/7 |

* cited by examiner

ACCESS CONTROL BY A MOBILE DEVICE USING AN IMAGE

BACKGROUND

A mobile device may require user authentication before allowing a user to access its resources. Without such user authentication, sensitive information on the mobile device is openly accessible if the mobile device is lost, stolen or even temporarily misplaced.

For example, suppose that a mobile device is currently offline. In such a situation, the mobile device may not have access to highly secure authentication mechanisms such as certain forms of multifactor authentication or adaptive authentication with an authentication server. Nevertheless, the mobile device may impose an offline user authentication requirement such as the need for the user to enter a multi-digit personal identification number (PIN).

SUMMARY

Unfortunately, there are deficiencies to the above-described conventional user authentication approach of requiring a user to enter a multi-digit PIN. For example, the number of digits in a typical PIN is four or five. It is often too burdensome and difficult for users to routinely remember and use longer PINs. Moreover, even if the number of digits in the multi-digit PIN were increased a few digits beyond four or five, an experienced hacker could still defeat the multi-digit PIN within a number of hours.

In contrast to the above-described conventional user authentication approach which requires a user to remember and enter a multi-digit PIN, improved techniques are directed to providing access control on a mobile device by prompting a user to enter a series of touch screen gestures over a displayed image. Such techniques allow the user to personalize what touch screen gestures are required for successful authentication in a manner that makes it convenient for the user to easily remember many touch screen gestures (i.e., well beyond four or five digits of a conventional PIN) using an expanded alphabet (i.e., a larger number of possible inputs for higher entropy than what is offered by digits 0-9). Such techniques are well suited for controlling access to sensitive resources particularly when a mobile device is offline without access to a stronger form of online authentication.

One embodiment is directed to a method of providing access control on a mobile device (e.g., a smart phone, a tablet, etc.). The method includes displaying an image on a touch screen of the mobile device and, while the image is displayed on the touch screen, receiving user input from a user. The user input includes user gestures applied to the touch screen over the displayed image (e.g., user gestures tracing over gridlines rendered over the image, user gestures jumbling/modifying segments of the image, etc.). The method further includes performing an access control operation which provides an access control result based on the user input. The access control result (i) provides access to a set of protected resources when the user input matches expected input and (ii) denies access to the set of protected resources when the user input does not match the expected input.

In some arrangements, performing the access control operation includes outputting, as the access control result, a match signal indicating that the user input matches the expected input, and providing access to a set of access control keys in response to the match signal. Each access control key is constructed and arranged to control access to a respective protected resource.

In some arrangements, the mobile device initially stores an encrypted container which contains the set of access control keys. In these arrangements, providing access to the set of access control keys includes decrypting the encrypted container which contains the set of access control keys to obtain access to the set of access control keys.

In some arrangements, providing access to the set of access control keys includes performing, by processing circuitry of the mobile device, a set of key derivation operations that: (i) uses the picture and the user input as key derivation function (KDF) inputs, and (ii) outputs the set of access control keys in response to the KDF inputs.

In some arrangements, the method further includes, prior to displaying the image on the touch screen of the mobile device, prompting the user to select the image from a displayed offering of multiple images. The image is displayed on the touch screen in response to the user selecting the image from the displayed offering of the multiple images.

In some arrangements, performing the access control operation which provides the access control results includes adding the selection of the image by the user to the user input, and comparing the user input, which includes the added selection of the image, to the expected input to determine whether the user is authentic.

In some arrangements, receiving the user input from the user while the image is displayed over the touch screen includes, while a set of gridlines is rendered over the image, receiving a set of user gestures which trace over the set of gridlines rendered over the image, each gridline extending from one edge of the image to another edge of the image. In these arrangements, performing the access control operation which provides the access control results may include comparing the received set of user gestures which traced over the set of gridlines to an expected set of user gestures to determine whether the user is authentic. Such user gestures may trace over one or more gridlines entirely (e.g., edge to edge), only a portion of a gridline, only over gridline intersection points, combinations thereof, and so on.

In some arrangements, receiving the user input from the user while the image is displayed over the touch screen includes, while a set of gridlines is rendered over the image to divide the image into an array of image segments, receiving a set of user gestures which identify particular image segments of the image. In these arrangements, performing the access control operation which provides the access control results may include comparing the received set of user gestures which identified particular image segments of the image to an expected set of user gestures to determine whether the user is authentic.

In some arrangements, receiving the user input from the user while the image is displayed over the touch screen includes, while a set of gridlines is rendered over the image to divide the image into an array of image segments and while a segment modification control panel is displayed adjacent to the image, receiving a set of user gestures which (i) identify segment modification commands of the segment modification control panel, and (ii) modify at least some of the image segments of the image based on the identified segment modification commands. In these arrangements, performing the access control operation which provides the access control results may include comparing the received set of user gestures which identified segment modification commands and modified at least some of the image segments to an expected set of user gestures to determine whether the user is authentic.

In some arrangements, receiving the set of user gestures includes receiving user gestures which rotate an image segment relative to other image segments.

In some arrangements, receiving the set of user gestures includes receiving user gestures which change a color of an image segment relative to other image segments.

In some arrangements, a first image segment initially resides at a first location on the touch screen and a second image segment initially resides at a second location on the touch screen. In these arrangements, receiving the set of user gestures includes receiving user gestures which swap the first image segment with the second image segment to re-locate the first image segment at the second location on the touch screen and the second image segment at the first location on the touch screen.

In some arrangements, receiving the set of user gestures includes receiving user gestures which flip an image segment about an axis to render a mirror image of the image segment. In particular, an image segment may be inversed horizontally, vertically, or horizontally and vertically.

It should be understood that, using a variety of user gestures to enter such segment modification commands, a user is able to jumble an initial image (e.g., a picture taken from a camera, a synthetic image, etc.) to form a jumbled image. A user is even able to un-jumble an initially jumbled image to restore an image to original form or to further jumble that image. Since such activities are relatively easy for the user to remember and repeat, mobile devices offering such capabilities in the context of access control enable users to create and remember longer user passwords (i.e., longer user gesture sequences) from a larger pool of selectable inputs (i.e., a larger password vocabulary formed by more choices than just the numbers 0-9).

Other embodiments are directed to electronic systems and apparatus, processing circuits, computer program products, and so on. Some embodiments are directed to various methods, electronic components and circuitry which are involved in providing access control using an image.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing access control on a mobile device (e.g., a smart phone, a tablet, etc.) by prompting a user to enter a series of touch screen gestures over a displayed image (i.e., to receive a series of user inputs). Such techniques allow the legitimate user to personalize what touch screen gestures are required for successful authentication in a manner that makes it convenient for the user to remember a long sequence of touch screen gestures (i.e., well beyond four or five digits of a conventional PIN) using an expanded alphabet (i.e., higher entropy than what is offered by digits 0-9). Such a technique is well suited for controlling access to a set of sensitive resources particularly when the mobile device is offline without access to a stronger form of online authentication.

Figure 1:
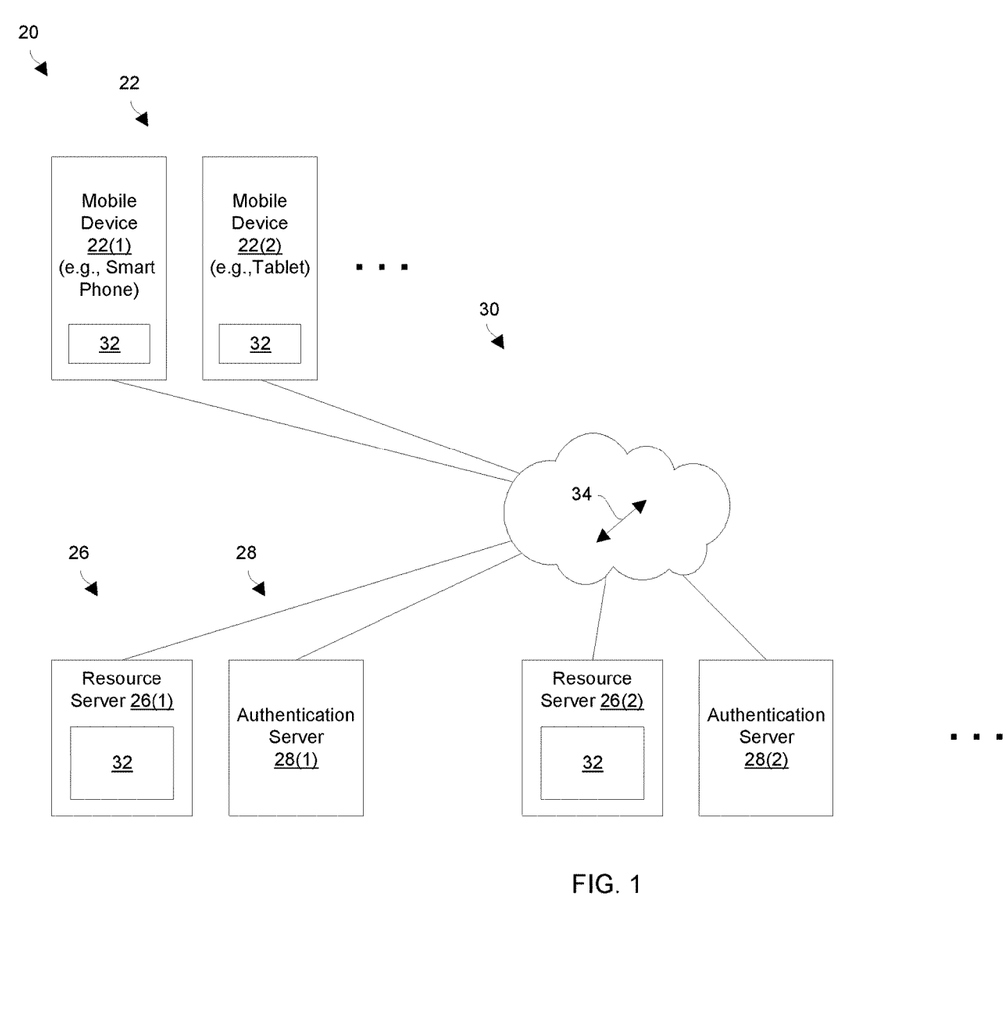
FIG. 1 is a block diagram of an electronic environment which includes mobile devices that use captured camera images for access control.

FIG. 1 shows an electronic environment 20 which includes mobile devices that use images for access control. The electronic environment 20 includes mobile devices 22(1), 22(2), . . . (collectively, mobile devices 22), resource servers 26(1), 26(2), . . . (collectively, resource servers 26), authentication servers 28(1), 28(2), . . . (collectively, authentication servers 28), and communications medium 30.

As will be explained in further detail below, each mobile device 22 is constructed and arranged to provide access control based on a series of touch screen gestures entered by a respective user (i.e., user input) over a displayed image. Along these lines, the user obtains access to a set of protected resources 32 when the user input matches expected input (e.g., a hash of previously entered coordinate selections). However, the user is denied access to the set of protected resources 32 when the user input does not match the expected input. It should be understood that stronger alternative forms of authentication may be available if the mobile devices 24 are online and able to communicate with the authentication servers 28, and that such alternative authentication forms may be used in place of matching touch screen gestures from a user when available.

The resource servers 26 are constructed and arranged to provide access to protected resources 32 following successful user authentication. Examples of suitable resource servers 26 include content servers, gateways, financial institutions, online stores, other transaction servers, etc.

Each authentication server 28 is constructed and arranged to perform authentication operations to authenticate users of the mobile devices 24. For example, the users of the mobile devices 22 may enter sequences of user gestures to obtain access to certain resources 32, and authenticate with the authentication servers 28 to obtain access to other resources 32. Suitable forms of authentication via the authentication servers 28 include multifactor authentication, adaptive authentication, and so on.

The communications medium 30 is constructed and arranged to connect the various components of the electronic environment 20 together to enable these components to exchange electronic signals 34 (e.g., see the double arrow 34). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting LAN-based communications, SAN-based communications, cellular communications, combinations thereof, etc.

It should be understood that there are a variety of resources which are suitable as the protected resources 32 that are accessed by the mobile devices 22. Such resources 32 may reside within the mobile devices 22 themselves such as access to particular local applications or apps, local file access (e.g., access to photos, emails, calendars, contact lists, etc.), access to games, and so on. Likewise, such resources may reside outside the mobile devices 22 such as wireless network access, access to make cellular calls, VPN access, enterprise gateway access, online store access, financial institution access, cloud storage and/or computing access, and so on. Further details will now be provided with reference to FIG. 2.

Figure 2:
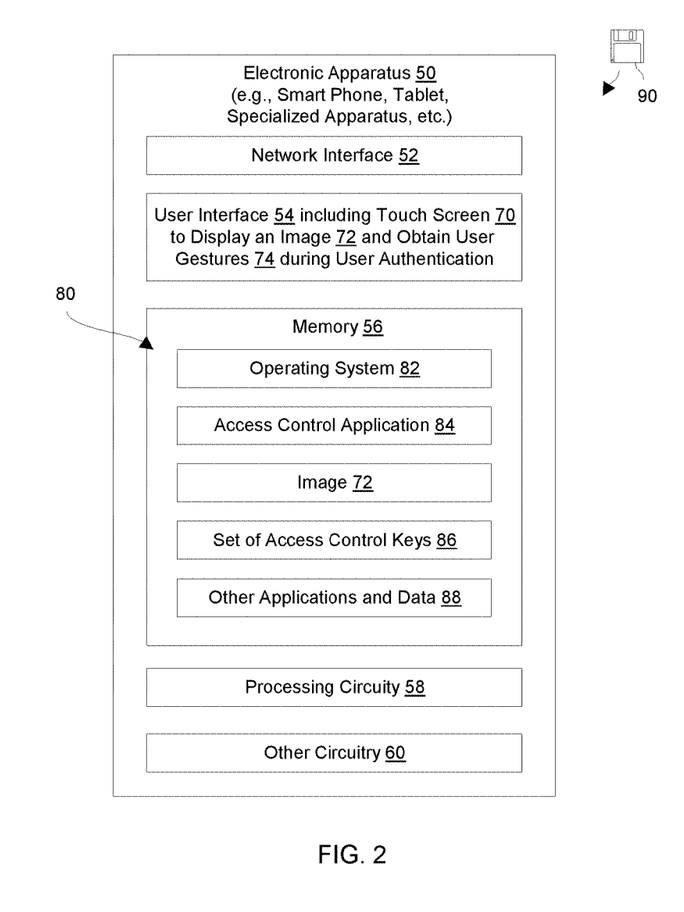
FIG. 2 is a block diagram of an electronic apparatus which is suitable for use as a mobile device of the electronic environment of FIG. 1.

FIG. 2 shows particular details of an electronic apparatus 50 which is equipped to provide access control to a set of protected resources 32 (FIG. 1) based on a series of touch screen gestures entered by a user over a displayed image. The electronic apparatus 50 is suitable for use as any of the mobile devices 22 (also see FIG. 1).

The architecture and/or form factor of the electronic apparatus 50 may be that of a portable wireless device such as a smart phone, a tablet, a specialized hand-held user device, combinations thereof, etc. Along these lines and as shown in FIG. 2, the electronic apparatus 50 includes a network interface 52, a user interface 54, memory 56, and processing circuitry 58, and additional (or other) circuitry 60.

The network interface 52 is constructed and arranged to connect the electronic apparatus 50 to the communications medium 30 to enable communications with other components of the electronic environment 20 (also see FIG. 1). Such communications may be IP-based, cellular-based, Bluetooth-based, combinations thereof, and so on.

The user interface 54 includes a touch screen 70 which is constructed and arranged to provide user output and receive user input. In particular, to authenticate the user, the touch screen 70 displays an image 72 to the user and obtains user gestures 74 from the user. The user interface 54 may include other user input/output (I/O) components such as a miniature keyboard, a microphone, a speaker, an accelerometer, and so on.

The memory 56 is intended to represent both volatile storage (e.g., DRAM, SRAM, etc.) and non-volatile storage (e.g., flash memory, etc.). The memory 56 stores a variety of software constructs 80 including an operating system 82, an access control application 84, the image 72, capabilities to derive a set of access control keys 86, and other applications and data 88.

The processing circuitry 58 is constructed and arranged to operate in accordance with the various software constructs 80 stored in the memory 56. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the electronic apparatus 50. The computer program product 90 has a non-transitory (or non-volatile) computer readable medium which stores a set of instructions which controls one or more operations of the electronic apparatus 50. Examples of suitable computer readable storage media include tangible articles of manufacture and apparatus which store instructions in a non-volatile manner such as CD-ROM, flash memory, disk memory, tape memory, and the like.

The additional circuitry 60 represents other portions of the electronic apparatus 50. For example, in the context of a smart phone or tablet, the electronic apparatus 50 may further include one or more digital cameras, GPS circuitry, and so on. In the context of a specialized device, the electronic apparatus 50 may include specialized circuitry such as specialized scanning circuitry, storage devices, peripherals, and so on. Moreover, in some arrangements, the other circuitry 60 may be one or more protected resources 32 which requires successful user authentication before the electronic apparatus 50 permits access.

During operation, the processing circuitry 58 executes one or more of the software constructs 80 to enable the user to perform useful work. In particular, the processing circuitry 58 runs the operating system 82 to allocate and manage resources such as processing cycles and memory. The processing circuitry 58 runs the access control application 84 to control access to certain protected resources 32 such as access to other applications and data 88 (e.g., file access, contact list access, access to photos and music, etc.), online access to the communications medium 30 and to remotely located protected resources 32, cellular phone access, and so on.

The image 72, when displayed on the touch screen 70 of the user interface 54, enables the legitimate user to easily recall particular user inputs (i.e., a repeatable series of user gestures) that must be provided by the user before the electronic apparatus 50 provides access to a set of protected resources 32. For example, in some arrangements, the legitimate user is required to enter a series of user gestures by tracing paths over particular gridlines which are rendered over the image 72 while the image 72 is displayed on the touch screen 70. In other arrangements, the legitimate user is required to enter a series of image segment selections perhaps with commands associated with image manipulation.

For these arrangements, it is more difficult for an unauthorized user (e.g., a hacker) to guess and/or try combinations of user inputs in an attempt to overcome the access control requirements. In particular, higher entropy is achieved with a larger number of possible user selections (i.e., an expanded vocabulary compared to standard digits 0-9). Moreover, individual ways of creating unique series of image segment selections not only enables users to easily remember their created series, but also makes it difficult for hackers to guess/anticipate. Accordingly, it will take the unauthorized user longer to defeat such authentication protection and/or the unauthorized user may decide not to even try in order to pursue less protected electronic devices.

The set of access control keys 86 becomes available once the legitimate user has successfully authenticated by providing the required series of user gestures 74. Here, each access control key 86 can unlock access to a particular protected resource 32.

In some arrangements, after the legitimate user has successfully authenticated, the processing circuitry 58 decrypts one or more containers (or files) holding the set of access control keys 86. That is, the set of access control keys 86 reside in an encrypted container and the processing circuitry 58 (while running the access control application 84) decrypts the container to expose the set of access control keys 86 in response to successful authentication.

In other arrangements, after the legitimate user has successfully authenticated, the processing circuitry 58 performs a set of key derivation operations to generate the set of access control keys 86. For example, the processing circuitry 58 (while running the access control application 84) applies a key derivation function (KDF) using the image 72 and the series of user gestures 74 (e.g., a hash of the selected series)

as inputs to the KDF. The output of the KDF is the set of access control keys 86. Further details will now be provided with reference to FIGS. 3 and 4.

Figure 3:
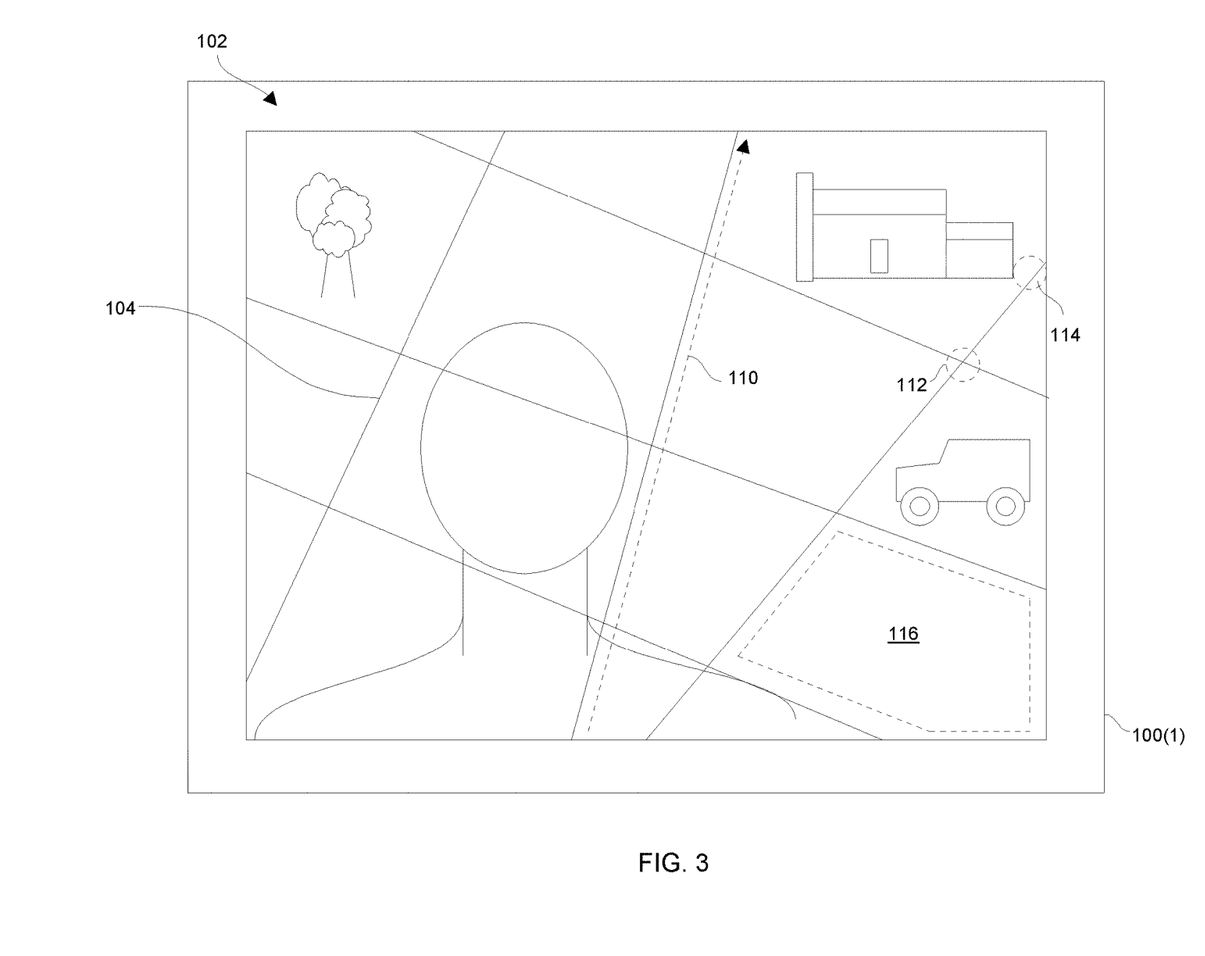
FIG. 3 is a diagram showing example touch screen details according a first embodiment.
Figure 4:
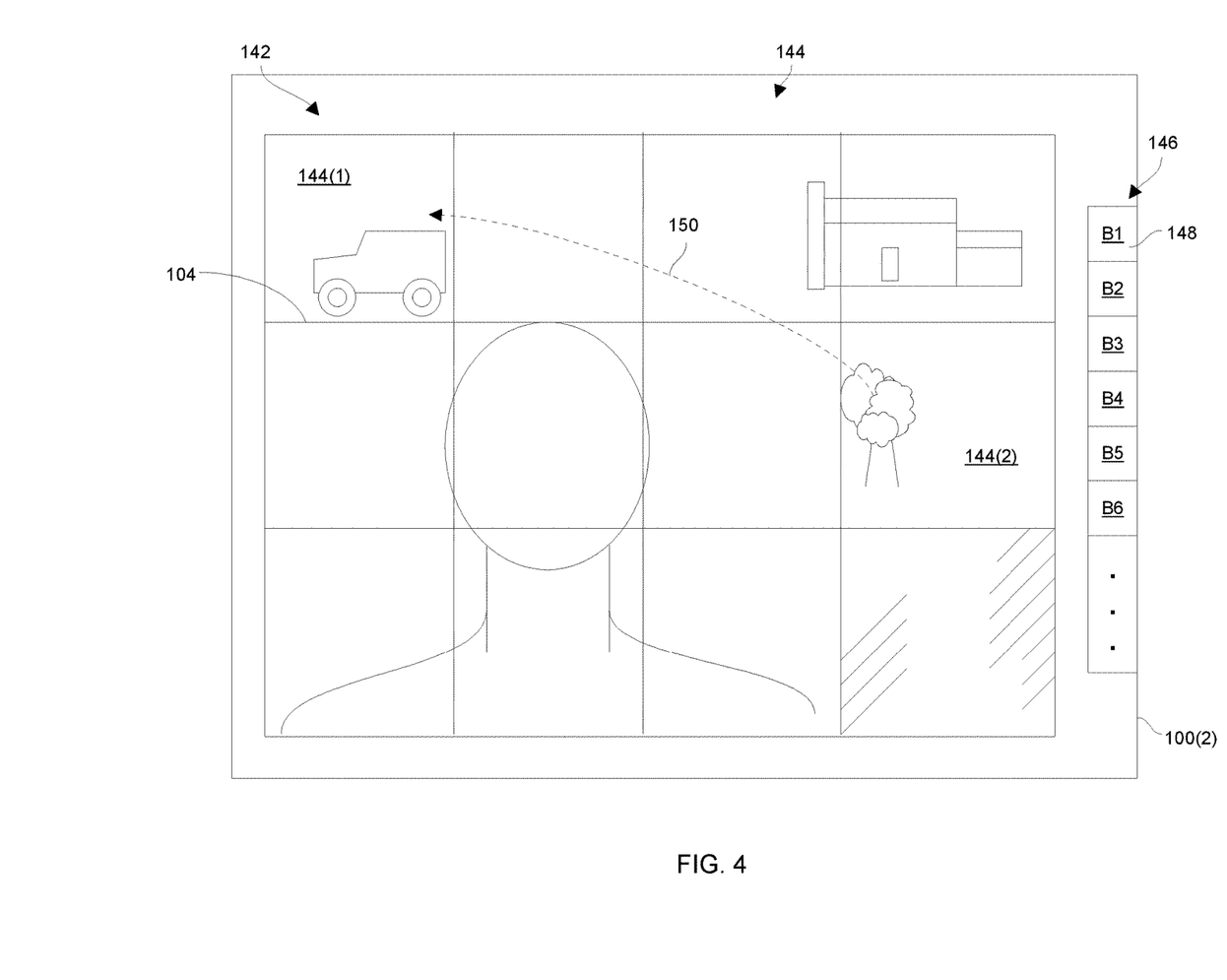
FIG. 4 is a diagram showing example touch screen details according a second embodiment.

FIGS. 3 and 4 show examples of particular touch screen details in accordance with certain embodiments. In particular, when a user wishes to enter user gestures in order to access a protected resource 32, the user may select an image 72 from a displayed offering of multiple images on the touch screen 70 (e.g., an array of image thumbnails, a list of images, etc. which prompts the user for an image selection). The user then selects the image 72 which is then enlarged on the touch screen 70. FIG. 3 shows a touch screen view 100(1) in accordance with a first embodiment. FIG. 4 shows a touch screen view 100(2) in accordance with a second embodiment.

In some arrangements, the selection of the image 72 among other images is considered part of the authentication process. That is, the selection of the image 72 is used as part of the user input which is evaluated to authenticate the user. Along these lines, only the legitimate user may know which image is used for authentication. A malicious person picking the wrong image would be denied access to the protected resource 32.

With reference to FIG. 3, the touch screen view 100(1) includes a displayed picture 102 (also see the image 72 in FIG. 2) and a set of gridlines 104 rendered over the displayed picture 102. The set of gridlines 104 may have been pre-positioned by the user during an initial password setup process, or may be automatically provided by the electronic apparatus 50.

One should appreciate that the touch screen view 100(1) offers the user a variety of possible user gestures. For example, the user may trace (or swipe) an entire gridline or a portion of a gridline (see dashed arrow 110 in FIG. 3 which represents a path traced by the user). Additionally, the user may touch (e.g., tap on) an intersection point 112 between two gridlines 104 or swipe to an edge point 114 where a gridline meets the edge of the image 72. Furthermore, the user may select an image segment 116 which is defined by the set of gridlines 104. The series of user gestures forms a password which, if correct, enables the user to access the protected resource.

One should see that the universe of selectable touch screen locations can be made very large. Easily with just a few gridlines 104, the number of selectable coordinates on the touch screen 70 can exceed the number of digits in a standard 0-9 PIN (i.e., 10 digits). Accordingly, the variety of selectable features provides the user with an abundance of screen coordinates from which to choose from and makes it difficult for an unauthorized user to guess correctly.

It should be understood that, in the embodiment shown in FIG. 3, there is no requirement that the gridlines 104 must be perfectly horizontal or vertical. Rather, the gridlines can be unevenly spaced, angled or diagonal, and cross other gridlines 104. Some gridlines 104 may extend from one edge of the displayed picture 102 to an opposite facing edge. Other gridlines may extend from one edge to an adjacent edge of the displayed picture.

Once the universe of selectable touch screen locations 106 is established in the electronic apparatus 50, the legitimate user is able to save a series of user gestures 74 into the electronic apparatus 50 (e.g., a series of at least eight user gestures, a series of at least 10 user gestures, etc.). In particular, the legitimate user configures the electronic apparatus 50 to require the same series of user gestures 74 for successful authentication. To avoid saving a copy of the actual series, the electronic apparatus 50 can generate a hash of the series and simply store the hash for comparison (i.e., matching) purposes.

In some arrangements, the hash (or series of user gestures) is used as an encryption key to decrypt a "bag of keys". That is, the series is used to decrypt an encrypted container which contains the set of access control keys. Each access control key is used to unlock access to a particular protected resource 32.

In other arrangements, the hash (or series of user gestures) is used as input to a key derivation function (KDF) which outputs the set of access control keys. Other data items can be included as input to the KDF as well such as the selected image 72 itself.

With reference to FIG. 4, the touch screen view 100(2) includes a displayed picture 142 which is derived from the same image 72 as that was used for the displayed picture 102 in FIG. 3. The touch screen view 100(2) of FIG. 4 further includes a set of gridlines 104 superimposed over the displayed picture 142 to divide the touch screen view 100(2) into separate uniform regions (or segments) 144(1), 144(2), . . . (collectively, image segments 144).

The touch screen view 100(2) also includes a control panel 146 of selectable image manipulation buttons 148 (see B1, B2, B3, B4, B5, B6, . . . in FIG. 4). For example, B1 may be a command to rotate a selected image segment 144 clockwise, and B2 may be a command to rotate a selected image segment 144 counterclockwise. B3 may be a command to flip a selected image segment 144 about a central vertical axis (i.e., flip the image segment 144 to provide a mirror image), and B4 may be a command to flip a selected image segment 144 about a central horizontal axis (i.e., flip the image segment 144 upside down). B5 may be a command to darken or change the color of a selected image segment 144 (e.g., selective application of particular color filters to chosen image segments 144), etc. Also, the user may drag and drop image segments 144 on top of each other to swap locations of image segments 144 (see arrow 150 which swaps image segments 144(1) and 144(2)), and so on.

The image segments 144 in combination with manipulation buttons 146 provides the user with an abundance of selectable regions from which to choose from. By way of example and as shown in FIG. 4, the touch screen view 100(2) is divided up into a two-dimensional matrix of 12 uniform selectable regions using just three vertical gridlines 104 and two horizontal gridlines 104. The two-dimensional matrix may have a different number of rows and columns (e.g., 3×4, 4×3, 4×4, etc.) than that shown in this example.

Here, the legitimate user is able to select the image 72 from which the displayed picture 102 is derived. The legitimate user is then able to manipulate the various image segments 144. For example, the legitimate user may touch image manipulation buttons and image segments 144 to form a jumbled image from a normal initial image or to further jumble an initially jumbled image. A legitimate user may even enter user gestures to un-jumble an initially jumbled image. Such activities are relatively easy for the user to remember and repeat even in relatively long sequences. However, due to the large number of possible selectable inputs, a malicious person would find it extremely difficult to correctly enter the correct sequence of user gestures. Further details will now be provided with reference to FIG. 5.

Figure 5:
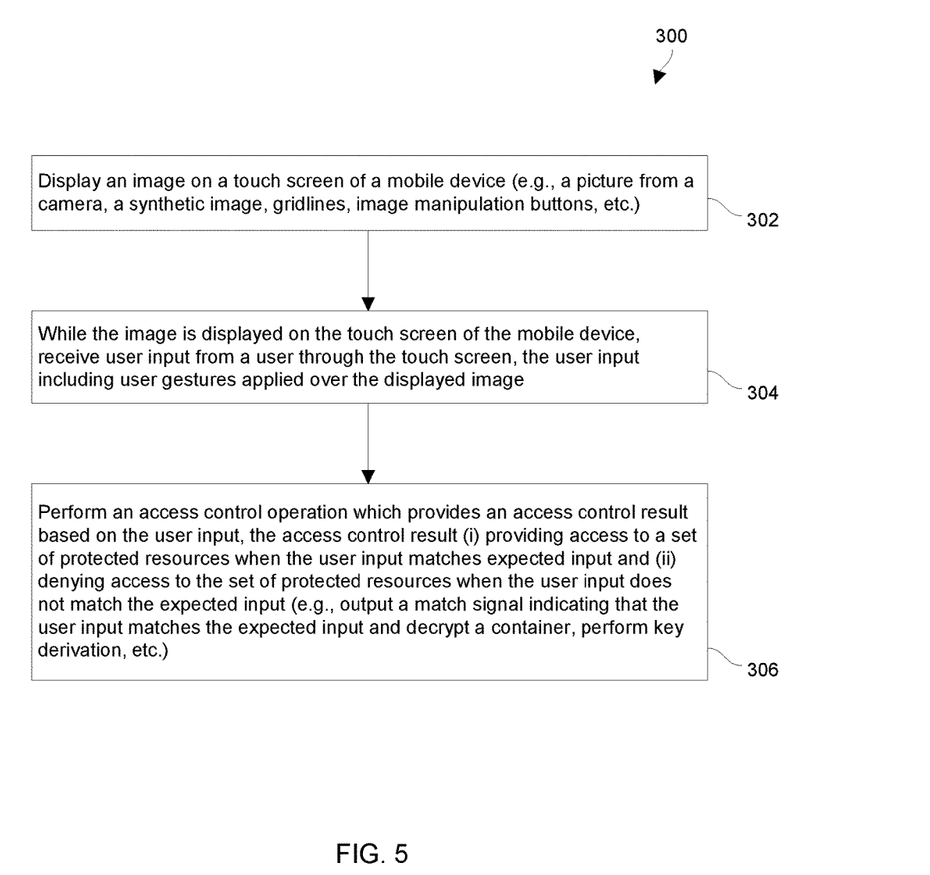
FIG. 5 is a flowchart of a procedure which is performed by the electronic apparatus of FIG. 2.

FIG. 5 is a flowchart of a procedure 300 which is performed by a mobile device to control access to a protected resource (FIG. 1). The procedure 300 utilizes a touch screen of the mobile device and an image stored in the mobile device (FIG. 2).

In step 302, the mobile device displays an image on the touch screen. The image may be a picture captured by a camera or a synthetic image (see displayed pictures 102, 142 in FIGS. 3 and 4). Additionally, gridlines may be rendered over the image and, in some arrangements, an image manipulation control panel is rendered adjacent the image (FIG. 4).

In step 304, while the image is displayed on the touch screen, the mobile device receives user input from a user. In particular, the user input is in the form of a series of user gestures (e.g., finger swipes, screen touches, etc.) provided by the user over the displayed image.

In step 306, the electronic apparatus 50 performs an access control operation which provides an access control result based on the user input. The access control result (i) provides access to a set of protected resources when the user input matches expected input (e.g., matches hashes) and (ii) denies access to the set of protected resources when the user input does not match the expected input.

As described above, improved techniques are directed to providing access control on a mobile device by prompting a user to enter a series of touch screen gestures over a displayed image. Such techniques allow the user to personalize what touch screen gestures are required for successful authentication in a manner that makes it convenient for the user to easily remember many touch screen gestures (i.e., well beyond four or five digits of a conventional PIN) using an expanded alphabet (i.e., a larger number of possible inputs for higher entropy than what is offered by digits 0-9). Such techniques are well suited for controlling access to sensitive resources particularly when a mobile device is offline without access to a stronger form of online authentication.

For example, the user may start with an un-jumbled picture, and enter a sequence of commands to jumble particular portions of the picture. Alternatively, the user may start with a jumbled picture, and enter a sequence of commands to un-jumble the picture. As yet another alternative, the user can start with an initial montage of lines and shapes, and the user can enter commands simply to manipulate certain lines and/or shapes, and/or trace over certain lines, and/or select certain line intersections. Other situations are suitable for use as well provided that such situations prompt the user for input which is difficult to guess and offers a wide assortment of choices.

While various embodiments of the present disclosure have been particularly shown and described, it will be understood by those skilled in the art that various changes in form and details may be made therein without departing from the spirit and scope of the present disclosure as defined by the appended claims.

What is claimed is:

1. A method of providing access control on a mobile device, the method comprising:
   displaying an image on a touch screen of the mobile device;
   while the image is displayed on the touch screen, receiving user input from a user, the user input including user gestures applied to the touch screen over the displayed image; and
   performing an access control operation which provides an access control result based on the user input, the access control result (i) providing access to a set of protected resources when the user input matches expected input and (ii) denying access to the set of protected resources when the user input does not match the expected input;
   wherein performing the access control operation includes:
      outputting, as the access control result, a match signal indicating that the user input matches the expected input, and
      providing access to a set of access control keys in response to the match signal, each access control key being constructed and arranged to control access to a respective protected resource; and
   wherein receiving the user input from the user while the image is displayed over the touch screen includes:
      while a set of gridlines is rendered over the image, receiving a set of user gestures which trace over the set of gridlines rendered over the image, each gridline extending from one edge of the image to another edge of the image;
   wherein at least one user gesture traces along at least a portion of a particular gridline of the set of gridlines to copy that portion of the particular gridline; and
   wherein performing the access control operation which provides the access control result further includes:
      comparing the received set of user gestures which traced over the set of gridlines to an expected set of user gestures to determine whether the user is authentic.

2. A method as in claim 1 wherein the mobile device initially stores an encrypted container which contains the set of access control keys; and wherein providing access to the set of access control keys includes:
   decrypting the encrypted container which contains the set of access control keys to obtain access to the set of access control keys.

3. A method as in claim 1 wherein providing access to the set of access control keys includes:
   performing, by processing circuitry of the mobile device, a set of key derivation operations that: (i) uses the picture and the user input as key derivation function (KDF) inputs, and (ii) outputs the set of access control keys in response to the KDF inputs.

4. A method as in claim 1, further comprising:
   prior to displaying the image on the touch screen of the mobile device, prompting the user to select the image from a displayed offering of multiple images;
   wherein the image is displayed on the touch screen in response to the user selecting the image from the displayed offering of the multiple images.

5. A method as in claim 4 wherein performing the access control operation which provides the access control result includes:
   adding the selection of the image by the user to the user input, and
   comparing the user input, which includes the added selection of the image, to the expected input to determine whether the user is authentic.

6. A method as in claim 1 wherein receiving the user input from the user while the image is displayed over the touch screen further includes:
   while the set of gridlines is rendered over the image to divide the image into an array of image segments, receiving another set of user gestures which identify particular image segments of the image.

7. A method as in claim 6 wherein performing the access control operation which provides the access control result includes:

comparing the received other set of user gestures which identified particular image segments of the image to an expected set of user gestures to determine whether the user is authentic.

8. A method as in claim 1 wherein receiving the user input from the user while the image is displayed over the touch screen further includes:
while the set of gridlines is rendered over the image to divide the image into an array of image segments and while a segment modification control panel is displayed adjacent to the image, receiving another set of user gestures which (i) identify segment modification commands of the segment modification control panel, and (ii) modify at least some of the image segments of the image based on the identified segment modification commands.

9. A method as in claim 8 wherein performing the access control operation which provides the access control result includes:
comparing the received other set of user gestures which identified segment modification commands and modified at least some of the image segments to an expected set of user gestures to determine whether the user is authentic.

10. A method as in claim 8 wherein receiving other the set of user gestures includes:
receiving user gestures which rotate an image segment relative to other image segments.

11. A method as in claim 8 wherein receiving the other set of user gestures includes:
receiving user gestures which change a color of an image segment relative to other image segments.

12. A method as in claim 8 wherein a first image segment initially resides at a first location on the touch screen and a second image segment initially resides at a second location on the touch screen; and wherein receiving the other set of user gestures includes:
receiving user gestures which swap the first image segment with the second image segment to locate the first image segment at the second location on the touch screen and the second image segment at the first location on the touch screen.

13. A method as in claim 8 wherein receiving the other set of user gestures includes:
receiving user gestures which flip an image segment about an axis to render a mirror image of the image segment.

14. A mobile device, comprising:
a touch screen;
memory; and
control circuitry coupled to the touch screen and the memory, the memory storing instructions which, when carried out by the control circuitry, cause the control circuitry to:
display an image on the touch screen,
while the image is displayed on the touch screen, receive user input from a user, the user input including user gestures applied to the touch screen over the displayed image, and
perform an access control operation which provides an access control result based on the user input, the access control result (i) providing access to a set of protected resources when the user input matches expected input and (ii) denying access to the set of protected resources when the user input does not match the expected input;
wherein receiving the user input from the user while the image is displayed over the touch screen includes:
while a set of gridlines is rendered over the image, receiving a set of user gestures which trace over the set of gridlines rendered over the image, each gridline extending from one edge of the image to another edge of the image;
wherein at least one user gesture traces along at least a portion of a particular gridline of the set of gridlines to copy that portion of the particular gridline; and
wherein performing the access control operation which provides the access control result includes:
comparing the received set of user gestures which traced over the set of gridlines to an expected set of user gestures to determine whether the user is authentic.

15. A computer program product having a non-transitory computer readable medium which stores a set of instructions to provide access control on a mobile device, the set of instructions, when carried out by computerized circuitry of the mobile device, causing the computerized circuitry to perform a method of:
displaying an image on a touch screen of the mobile device;
while the image is displayed on the touch screen, receiving user input from a user, the user input including user gestures applied to the touch screen over the displayed image; and
performing an access control operation which provides an access control result based on the user input, the access control result (i) providing access to a set of protected resources when the user input matches expected input and (ii) denying access to the set of protected resources when the user input does not match the expected input;
wherein receiving the user input from the user while the image is displayed over the touch screen includes:
while a set of gridlines is rendered over the image, receiving a set of user gestures which trace over the set of gridlines rendered over the image, each gridline extending from one edge of the image to another edge of the image; and
wherein at least one user gesture traces along at least a portion of a particular gridline of the set of gridlines to copy that portion of the particular gridline; and
wherein performing the access control operation which provides the access control result includes:
comparing the received set of user gestures which traced over the set of gridlines to an expected set of user gestures to determine whether the user is authentic.

16. A method as claim 1, further comprising:
purposefully unevenly spacing the gridlines of the set of gridlines to form image segments having different shapes and sizes.

17. A method as in claim 1, further comprising:
dividing an original image into segments and jumbling the segments into different segment locations to form the image displayed on the touch screen.

18. A method as in claim 17 wherein the jumbled segments forms a puzzle; and wherein receiving the user input from the user further includes:
obtaining user gestures to unjumble the segments to solve the puzzle.

19. A method as in claim 1 wherein each user gesture of the set of user gestures parallels a portion of a respective gridline of the set of gridlines to successfully authenticate the user.

20. A method as in claim 1 wherein the set of user gestures includes multiple user swipes which follow portions of the set of gridlines to successfully authenticate the user.

21. A method as in claim 1 wherein receiving the set of user gestures includes:

receiving a current user gesture in response to the user drawing a path over the portion of the particular gridline.

22. A method as in claim 21 wherein comparing the received set of user gestures includes:

prior to providing the match signal, matching (i) the current user gesture received in response to the user drawing the path over the portion of the particular gridline to (ii) an expected user gesture to determine whether the user input matches the expected input.

\* \* \* \* \*